United States Patent Office 3,418,355
Patented Dec. 24, 1968

3,418,355
DIDECYL QUATERNARY AMMONIUM COMPOUNDS
Rudolf Rüegg, Bottmingen, and Gottlieb Ryser, Basel, Switzerland, assignors to Hoffmann-LaRoche Inc., Nutley, N.J., a corporation of New Jersey
No Drawing. Filed Oct. 12, 1965, Ser. No. 495,309
Claims priority, application Switzerland, Oct. 16, 1964, 13,487/64
12 Claims. (Cl. 260—459)

ABSTRACT OF THE DISCLOSURE

Quaternary ammonium compounds having activity against fungi, particularly against Dermatophytes, are prepared by quaternization of tertiary amines. The products are quaternary amines having two n-didecyl substituents and two lower aliphatic substituents.

---

The present invention pertains to novel quaternary ammonium compounds and to the preparation and use thereof. More particularly the invention in its product aspect pertains to new quaternary ammonium compounds of the formula

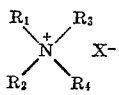
I wherein two of the substituents $R_1$, $R_2$, $R_3$ and $R_4$ represent n-decyl, one of $R_1$, $R_2$, $R_3$ and $R_4$ represents lower alkenyl, lower alkynyl, hydroxy-lower alkyl, lower alkoxy-lower alkyl, carboxy-lower alkyl or carbalkoxy-lower alkyl, and the other of $R_1$, $R_2$, $R_3$ and $R_4$ represents lower alkyl, lower alkenyl or lower alkynyl and X represents the anionic moiety of an acid.

The lower alkyl, alkenyl, alkynyl, hydroxyalkyl, alkoxyalkyl, carboxyalkyl and carbalkoxyalkyl groups in the foregoing general formula preferably contain from 1 to 7 carbon atoms, either straight or branched chain. Representative groups answering this description are, for example: methyl, ethyl; allyl, dimethyl-allyl, α-methyl-allyl; propargyl, α-methylpropargyl; hydroxymethyl, hydroxyethyl, hydroxybutyl; methoxymethyl, methoxyethyl, ethoxymethyl; carboxymethyl, carboxyethyl; carbomethoxymethyl carbethoxymethyl and carbomethoxyethyl.

The anionic moiety can be either organic or inorganic. It can, for example, be a halogen atom such as chlorine, bromine or iodine or the anion of a sulfur-containing organic acid, especially a sulphonic acid such as methane-sulphonic acid, benzene, sulphonic acid or toluene-sulphonic acid. Chlorine, bromine and the anion of methane-sulphonic acid are preferred.

In its process aspect the present invention pertains to the preparation of compounds of Formula I by the quaternization of a tertiary amine of the formula

II with a compound of the formula $R_4X$    III wherein $R_1$, $R_2$, $R_3$ and $R_4$ have the above significance.

The quaternization reaction is suitably effected by using the tertiary amine of Formula II and the compound of Formula III in about equimolar amounts. This reaction is conveniently effected in the presence of an inert solvent such as acetone, alcohol, ethyl acetate, dimethyl-formamide, petroleum ether and the like. The reaction temperature is not critical though it is preferred to operate at an elevated temperature, preferably between about 50° C. and about 130° C.

In a preferred embodiment of the process aspect of this invention, the quaternization reaction employs a tertiary amine and a compound of Formula III such that the group to be introduced, i.e. $R_4$ in Formula III is a lower alkenyl, lower alkynyl, hydroxy-lower alkyl, alkoxy-lower alkyl, lower carboxy-lower alkyl or a carbalkoxy-lower alkyl group.

The tertiary amines of Formula II which are employed as starting materials are essentially known substances and can be manufactured by the usual methods from primary or secondary amines by introduction of the desired group.

The quaternary ammonium compounds of this invention are useful as fungicides or fungistatic agents. In particular, they are active against the dermatophytes which predominantly cause foot mycosis (e.g. *Trichophyton mentagrophytes, Trichophyton rubrum* and *Epidermophyton floccosum*) as well as against other dermatophytes (e.g. *Trichophyton schoenleinii* and *Microsproum canis*). They are also active against yeasts such as *Candida albicans*, mold fungi such as *Aspergillus fumigatus* and bacteria such as Streptococci, Staphylococci, Coli and Pyocyaneus and accordingly exhibit a broad antimicrobial spectrum.

Since foot mycosis can be codependent on yeasts and bacteria, the specified compounds are especially suitable for this indication.

The novel compounds of this invention can be used as medicaments; for example, in the form of pharmaceutical preparations which contain them in amounts of about 0.2 to 5% in admixture with a pharmaceutical, organic or inorganic inert carrier material suitable for local application, such as, for example, water, gelatin, lactose, starch, magnesium stearate, talc, vegetable oils, gums, polyalkylene glycols, Vaseline, etc. The pharmaceutical preparations can, for example, be submitted in powder form or in liquid form, e.g. as a solution, a suspension, an emulsion or an aerosol. They may contain additives such as preserving, stabilizing, wetting or emulsifying agents or buffers. They can also contain other therapeutically valuable materials.

The following examples illustrate the invention but are not to be construed as limitative thereon. All temperatures are in degrees centigrade.

EXAMPLE 1

100 g. of n-didecyl methyl amine were dissolved in 300 ml. of acetone and treated with 50 g. of allyl bromide. The mixture was boiled under reflux for 5 hours. The solvent was distilled off, the viscous residue extracted three times with 500 ml. of petroleum ether (boiling range 40–45°) each time and dried in vacuum at 50°. n-Didecyl allyl methyl ammonium bromide was obtained as a colorless, hygroscopic wax of melting point 40–45°.

EXAMPLE 2

100 g. of n-didecyl methyl amine were dissolved in 300 ml. of acetone and treated with 30 g. of allyl chloride. The mixture was boiled under reflux for 5 hours. After distilling off the solvent, the residue was dissolved in 500 ml. of 80% aqueous methanol and this methanol solution was extracted three times with 200 ml. of petroleum ether (boiling range 40–45°) each time. The methanol solution was then evaporated in vacuo and the residue dried in vacuo. n-Didecyl allyl methyl ammonium chloride was obtained as a colorless, viscous and hygroscopic oil which in time solidified.

EXAMPLE 3

100 g. of n-didecyl allyl amine were dissolved in 400 ml. of petroleum ether (boiling range 40–45°) and 37.5 g. of dimethyl sulfate were added dropwise with stirring.

The mixture was heated under reflux for two hours and allowed to stand overnight. On the next day, the paste obtained was filtered off and rewashed with petroleum ether. The salt was dried in vacuo over phosphorous pentoxide. n-Didecyl allyl methyl ammonium methosulfate was obtained as a white wax of melting point 30–33°.

EXAMPLE 4

100 g. of n-didecyl methyl amine were dissolved in 500 ml. of petroleum ether (boiling range 40–45°), treated with 60 g. of dimethyl-allyl bromide and heated under reflux for 4 hours. After cooling, the precipitated salt was filtered off, washed with petroleum ether and dried in vacuo. n-Didecyl dimethyl-allyl methyl ammonium bromide was obtained as a white, hygroscopic powder of melting point 66–67°.

EXAMPLE 5

100 g. of n-didecyl methyl amine were dissolved in 400 ml. of petroleum ether (boiling range 40–45°), treated with 40 g. of propargyl bromide and heated under reflux for 5 hours. After cooling, the oil which precipitated was separated, washed several times with petroleum ether and dried in vacuum. n-Didecyl propargyl methyl ammonium bromide was obtained as a reddish, viscous oil;

$$n_D^{25°} = 1.4967$$

EXAMPLE 6

100 g. of n-didecyl allyl amine were dissolved in 400 ml. of absolute ether and treated with 40 g. of allyl bromide. The mixture was heated under reflux for 5 hours. After evaporation of the ether, the oily residue was extracted three times with 300 ml. of petroleum ether (boiling range 40–45°) each time and the insoluble oil was dried in vacuo. n-Didecyl diallyl ammonium bromide was obtained as a colorless, viscous oil; $n_D^{24°} = 1.4985$.

EXAMPLE 7

100 g. of n-didecyl propargyl amine were dissolved in 300 ml. of petroleum ether (boiling range 40–45°), treated with 40 g. of propargyl bromide and heated under reflux for 5 hours. After cooling, the liquid was decanted from the precipitated oil and the oil was extracted twice with 300 ml. of petroleum ether (boiling range 40–45°) each time. The insoluble oil was dried in vacuo. n-Didecyl dipropargyl ammonium bromide was obtained as a colorless, viscous oil; $n_D^{26°} = 1.5023$.

EXAMPLE 8

100 g. of n-didecyl propargyl amine were dissolved in 400 ml. of acetone, treated with 40 g. of allyl bromide and heated under reflux for two hours. The solvent was distilled off and the residue extracted three times with 300 ml. of petroleum ether (boiling range 40–45°) each time. The insoluble oil was dried in vacuo. n-Didecyl allyl propargyl ammonium bromide was obtained as a colorless, viscous oil; $n_D^{22°} = 1.5032$.

EXAMPLE 9

100 g. of n-didecyl methyl amine were dissolved in 400 ml. of acetone, treated with 40 g. of ethylene bromohydrin and heated under reflux for 5 hours. After evaporation of the acetone, the oil which remained was extracted three times with 200 ml. of petroleum ether (boiling range 40–45°) each time and the insoluble oil was dried in vacuo. n-Didecyl hydroxy ethyl methyl ammonium bromide was obtained as a slightly red-colored, viscous oil; $n_D^{28°} = 1.4860$.

EXAMPLE 10

100 g. of n-didecyl methyl amine were dissolved in 400 ml. of acetone, treated with 50 g. of bromo-ethyl methyl ether and the solution was heated under reflux for 5 hours. The solvent was distilled off and the residue extracted three times with 200 ml. of petroleum ether (boiling range 40–45°) each time. The insoluble oil was dried in vacuo. n-Didecyl methoxy-ethyl methyl ammonium bromide was obtained as a yellow, hygroscopic wax of melting point 64–66°.

EXAMPLE 11

100 g. of n-didecyl methyl amine were dissolved in 400 ml. of ethanol, treated with 60 g. of methoxybutyl bromide and the solution heated under reflux for 4 hours. After evaporation of the solvent, the residue was extracted three times with 200 ml. of petroleum ether (boiling range 40–45°) each time and the insoluble oil dried in vacuo. n-Didecyl methoxy-butyl methyl ammonium bromide was obtained as a yellow, viscous oil;

$$n_D^{28°} = 1.4873$$

EXAMPLE 12

100 g. of n-didecyl methyl amine were dissolved in 400 ml. of acetone, treated with 45 g. of chloro-acetic acid ethyl ester and this solution was heated under reflux for 5 hours. After evaporation of the solvent, the residue was extracted three times with 200 ml. of petroleum ether (boiling range 40–45°) each time and the insoluble oil dried in vacuum. n-Didecyl carboethoxy-methyl methyl ammonium bromide was obtained as a colourless wax of melting point 42–45°.

EXAMPLE 13

Manufacture of a paste of the following composition

|  | G. |
|---|---|
| n-Didecyl allyl methyl ammonium bromide | 2.0 |
| Titanium dioxide | 3.0 |
| Deodorized lanolin | 2.0 |
| Yellow Vaseline | 3.0 |
| Stearin | 6.0 |
| Cetyl alcohol | 6.0 |
| Tween 60 | 5.0 |
| Aqua dest. ad 100.0 g. | |

Deodorized lanolin, yellow Vaseline, stearin, cetyl alcohol and Tween 60 in the amounts specified above were melted with each other on a steam bath (A). The hot water (about 75°) was added to the hot melt A (about 70–75°) in a spray. The whole was cold-stirred at room temperature. In doing this, the evaporated water was continuously replaced with distilled water (B).

After individually finely sieving, the active material and titanium dioxide were mixed with each other (C). The ointment base (B) was gradually admixed with the powder mixture C, attention being paid that the powder mixture C was well ground with the ointment base B and finely divided in the latter. Evaporated water was replaced.

EXAMPLE 14

Manufacture of a salve of the following composition:

|  | G. |
|---|---|
| n-Didecyl allyl methyl ammonium bromide | 1 |
| Silicic acid "Aerosil" | 4 |
| Titanium dioxide | 20 |
| Talc | 20 |
| Glycerin (pure) | |
| Distilled water ad 100 g. | |

The active substance was dissolved in the water at about 50° (A).

The silicic acid was worked up in a mortar at room temperature, by means of a homogenizer, to a homogeneous mixture, and then mixed with the glycerin (B).

The aqueous solution (A) was now given to the mixture (B) and homogenized with the aid of a homogenizer (C).

To the mixture (C) was added, portionwise, the finely sieved mixture of titanium dioxide and talc. Homogenization was effected after each added portion by means of a homogenizer, so that there was formed a fine, lump-free salve. After replacement of evaporated water, the finished salve was filled into tubes, which were immediately shut.

We claim:
1. A quaternary ammonium compound of the formula

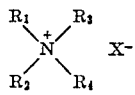

wherein two of the substituents $R_1$, $R_2$, $R_3$ and $R_4$ represent decyl, one of $R_1$, $R_2$, $R_3$ and $R_4$ represents lower alkenyl, lower alkynyl, hydroxy-lower alkyl or lower alkoxy-lower alkyl and the other of $R_1$, $R_2$, $R_3$ and $R_4$ represents lower alkyl, lower alkenyl or lower alkynyl and X represents the anionic moiety of an acid.
2. n-Didecyl allyl methyl ammonium bromide.
3. n-Didecyl allyl methyl ammonium chloride.
4. n-Didecyl allyl methyl ammonium methosulfate.
5. n-Didecyl dimethyl-allyl methyl ammonium bromide.
6. n-Didecyl propargyl methyl ammonium bromide.
7. n-Didecyl diallyl ammonium bromide.
8. n-Didecyl dipropargyl ammonium bromide.
9. n-Didecyl allyl propargyl ammonium bromide.
10. n-Didecyl hydroxyethyl methyl ammonium bromide.
11. n-Didecyl methoxyethyl methyl ammonium bromide.
12. n-Didecyl methoxybutyl methyl ammonium bromide.

References Cited

UNITED STATES PATENTS

| | | | |
|---|---|---|---|
| 2,191,922 | 2/1940 | Bruson | 260—583 |
| 2,195,194 | 3/1940 | Ulrich et al. | 28—1 |
| 2,592,273 | 4/1952 | Goebel et al. | 260—2 |
| 3,165,465 | 1/1965 | Ray et al. | 210—53 |

FOREIGN PATENTS 858,719  1/1961  Great Britain.

OTHER REFERENCES

Bennett et al., Chem. Ab., vol. 61, 4892h.

CHARLES B. PARKER, *Primary Examiner.*

L. C. MARUZO, *Assistant Examiner.*

U.S. Cl. X.R.

260—567.6, 482; 167—30, 63, 62, 58